G. W. SUTHERLAND.
DEVICE FOR STRETCHING WIRE AROUND WOODEN PIPES.
APPLICATION FILED AUG. 19, 1914.
1,154,275.
Patented Sept. 21, 1915.
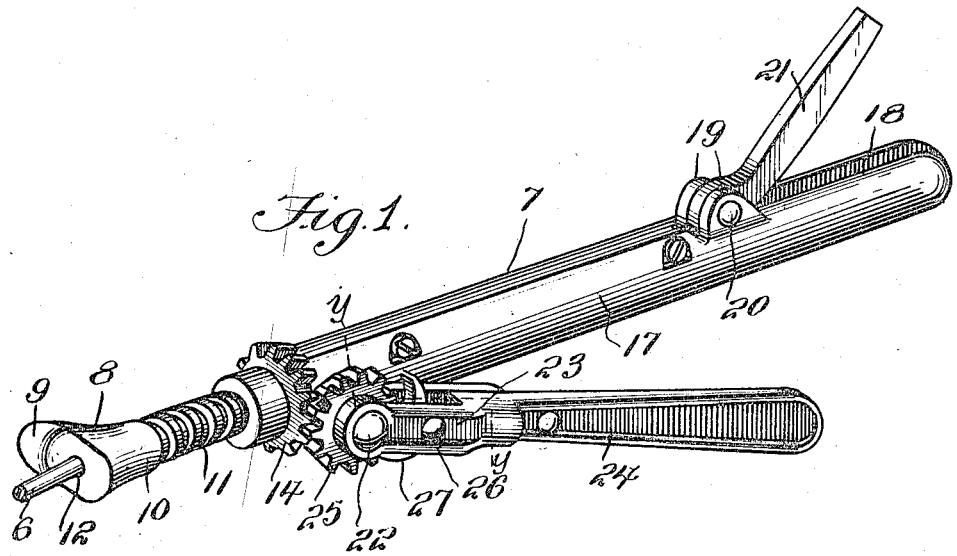
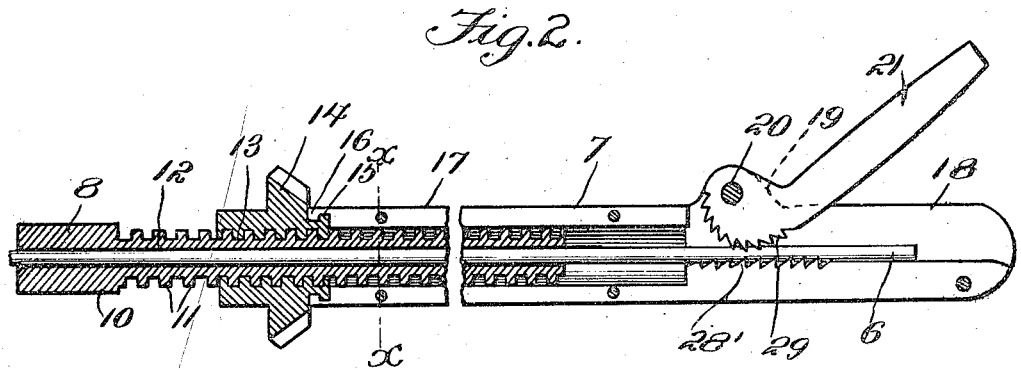
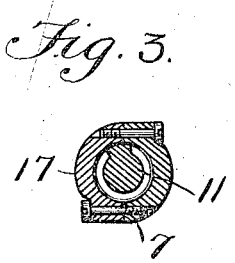
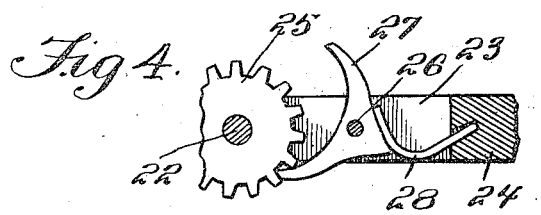
Witnesses
Inventor
G. W. Sutherland
By Victor J. Evans
Attorney

UNITED STATES PATENT OFFICE.

GEORGE W. SUTHERLAND, OF NEWPORT, WASHINGTON.

DEVICE FOR STRETCHING WIRE AROUND WOODEN PIPES.

1,154,275.   Specification of Letters Patent.   Patented Sept. 21, 1915.

Application filed August 19, 1914. Serial No. 857,577.

*To all whom it may concern:*

Be it known that I, GEORGE W. SUTHERLAND, a citizen of the United States, residing at Newport, in the county of Pend Oreille and State of Washington, have invented new and useful Improvements in Devices for Stretching Wire Around Wooden Pipes, of which the following is a specification.

The present invention relates to improvements in wire stretching devices.

The improvement consists in the construction, combination and operative arrangement of parts set forth in the following specification and falling within the scope of the appended claims.

In the drawings: Figure 1 is a perspective view of my improved stretcher, Fig. 2 is a central vertical longitudinal sectional view through the same, Fig. 3 is a transverse sectional view approximately on the line *x—x* of Fig. 2, and Fig. 4 is a detail longitudinal sectional view on the line *y—y* of Fig. 1.

In wooden tubes, or like structures, which are generally constructed of staves, or sections, it is necessary that the same be reinforced by suitable bands, the said bands being ordinarily in the nature of metal straps which are bent to conform to the shape of the wooden tube and have their ends one overlapping the other and connected by rivets or the like. In wooden forms, such as molds for concrete, some effective means must also be provided for holding the sections of the form, as the said sections are subjected to great strain by the plastic material being tamped within the same. In a great number of tubular forms or members, it is essential that the bracing or reinforcing member be subject to tightening, when the tube is contracted by weather conditions, and it is also essential that the reinforcing band be so arranged as to be readily removed from the tube when desired, as for instance, when the form is to be removed when the plastic material is thoroughly dry and hard or when repairs are to be made to the tube and for other reasons.

In carrying out my invention I employ a puller or stretcher member 7. The member 7 includes a head 8 having an outer smooth face provided upon one end with an outturned lip 9, the head 8 having a rounded extension 10 which may be reduced and threaded, as at 11. The rounded member 10, as well as the threaded member 11 is provided with a longitudinally extending opening 12, and the threads 11 co-act with similar threads in the hub 13 of a beveled toothed wheel 14, the inner face of the said wheel being provided with an annular angular flange 15 which is received within an inturned flange or bead 16 provided upon a hollow handle 17. The handle is cast as a whole or in sections, the said sections being secured together in any desired or preferred manner, and by arranging the said sections with the bead 16 engaging the flange 15, the toothed wheel 14 is rotatably connected with the handle. The handle is provided with a slot or opening 18, the opposite longitudinal walls of which are formed with outturned ears 19, while pivoted between the said ears, as at 20, is a cam lever 21, the cam head of said lever being arranged within the hollow handle 17.

Arranged at a right angle to the longitudinal opening 18, at the end of said handle provided with the toothed wheel 14, is a pivot 22, the same securing the bifurcated end 23 of the lever 24 to the handle 17. Arranged between the bifurcated arms of the lever and journaled upon the pivot 22 is a beveled tooth wheel 25 which meshes with the toothed wheel 14, and also arranged between the bifurcated arms of the said lever and pivoted thereto, as at 26, is a substantially U-shaped dog 27 which may be influenced by a spring 28 to retain either one of its engaging ends between two of the teeth of the wheel 25.

The free end of a wire 6 is passed through the opening 12 in the longitudinally movable headed member 8, the same being brought below the cam face of the lever 21, and the section of the hollow handle opposite the cam face may be provided with teeth 28', while the cam head of the said lever may also be provided with teeth 29, the end of the wire 6 being arranged between the said teeth and the cam lever operated to secure the said end of the wire within the hollow handle. The dog 27 is swung to bring one of its engaging ends between two of the teeth of the wheel 25. The lever is then rotated upon its pivot 22, rotating the beveled tooth wheel 14 and causing the screw 11 to be forced outwardly of the handle 17, thus enlarging or lengthening the stretcher, and as a consequence drawing the looped wire 6 sufficiently taut. When the wire is brought to such a condition, the lip 9 of the head 8 is brought into engagement with the support for the wire, the said support providing a fulcrum, and the stretcher is swung upon the said fulcrum until the wire is bent or stretched.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

1. A wire stretching device including a head having a threaded extension and having an opening through the head and through the threaded extension through which the end of the wire may be passed, a hollow handle having a beveled toothed wheel rotatably connected therewith, said wheel having a hub provided with a threaded bore which engages with the threaded extension of the head, a lever having a cam head arranged within the hollow handle and adapted to engage with the wire end, and means for rotating the beveled tooth wheel to reciprocate the threaded member of the head within the hollow handle.

2. In a wire stretcher as herein described, a headed member provided with a lip and being formed with an angularly disposed tubular threaded extension, the head having an opening communicating with the bore of the tubular extension and the said openings being adapted to receive one end of a wire which may be passed through the tubular extension, a hollow handle having a toothed wheel rotatably connected therewith, said wheel having a threaded bore which receives the threaded tubular member of the head, a lever having a cam head arranged within the handle and adapted to engage with the wire projecting through the tubular member of the head to within the handle, a second lever pivotally secured to the handle, a toothed wheel carried by the said second lever and intermeshing with the first-mentioned toothed wheel, and a dog carried by the second lever and adapted to engage between the teeth of the wheel thereon.

3. The herein-described construction of wire stretcher, including a hollow handle made up of two mating sections and having one of its ends formed with an inturned annular bead, the said handle having a longitudinal opening and ears arranged upon the opposite walls of the opening, a lever pivoted between the ears, said lever having a cam head provided with teeth, the bore of the handle opposite the lever being also formed with teeth, a toothed wheel having its outer face provided with a hub and its inner face provided with an annular angular extension which is arranged within the tubular handle and engaged by the bead thereof, the bore of the hub being threaded, a lever having a bifurcated end pivotally connected with the handle, a toothed wheel meshing with the first-mentioned toothed wheel arranged within the bifurcation of the lever, an arcuate dog having two engaging faces pivoted within the bifurcation of the handle, a spring for the dog, and the said dog adapted to be engaged between the teeth of the wheel carried by the lever, a threaded member co-acting with the threads in the bore of the hub of the first-mentioned wheel, a head for the member, and an offset lip upon the head, said member and head being provided with a wire-receiving opening.

In testimony whereof I affix my signature in presence of two witnesses.

GEORGE W. SUTHERLAND.

Witnesses:
O. C. NELSON,
CHESTER A. GROVER.